United States Patent [19]

Gonzalez Barberan

[11] 3,985,901

[45] Oct. 12, 1976

[54] PREPARATION OF ACIDOPHIL MILK IN POWDER FORM

[75] Inventor: Carlos Gonzalez Barberan, Madrid, Spain

[73] Assignee: Instituto de Biologia Aplicada, S.A., Spain

[22] Filed: Nov. 11, 1974

[21] Appl. No.: 522,862

[52] U.S. Cl. .................................. 426/43; 426/34; 426/61; 426/385; 426/453; 426/588
[51] Int. Cl.² ...................... A23C 9/12; A23C 1/04; A23C 1/06
[58] Field of Search ................. 426/34, 43, 61, 385, 426/580, 588, 453

[56] References Cited

UNITED STATES PATENTS

| | | | |
|---|---|---|---|
| 3,320,139 | 5/1967 | Henry | 426/43 X |
| 3,321,319 | 5/1967 | Hackenberg et al. | 426/43 X |
| 3,326,693 | 6/1967 | Reuter | 426/43 |
| 3,793,465 | 2/1974 | Bohren | 426/43 X |
| 3,876,808 | 4/1975 | Anderson | 426/34 X |

FOREIGN PATENTS OR APPLICATIONS

| | | |
|---|---|---|
| 16,725 | 3/1963 | Japan |
| 37,825 | 5/1965 | Japan |

*Primary Examiner*—David M. Naff
*Attorney, Agent, or Firm*—Wenderoth, Lind & Ponack

[57] ABSTRACT

Powdered acidophil fermented milk products that can be readily reconstituted are prepared by spray drying milk which has been fermented with acidophil bacteria to produce a powdered product, agglomerating the powdered product, lyophilizing a culture of acidophil bacteria under specific conditions to insure maximum survival of the bacteria to produce a foamy dried mass containing live acidophil bacteria, grinding the foamy dried mass and mixing the resultant ground powdered product with the agglomerated powdered product to produce a powdered acidophil milk product that can be readily reconstituted to produce an acidophil milk containing about 200 million acidophil bacteria per cc.

8 Claims, No Drawings

PREPARATION OF ACIDOPHIL MILK IN POWDER FORM

Various studies, initiated primarily by Metschnikoff (1845–1916) have, during the first half of the present century, clarified that fermented milks, traditionally used in many countries for years, have valuable properties with regard to disorders of intestinal functions, bacterial toxi-infections of the digestive tract, disorders of the intestinal microbial flora symbiotic with humans, etc. Thus, there are numerous scientific works which have confirmed the beneficial properties of fermented milk in diarrheas (Fikof and Mayer 1941), in certain intestinal disorders (Mejlbov Nygart 1940), in intestinal desintoxication (Gonzalez Galvan 1944), in the frequency of belching or eructations, flatulency (Schroeder 1946) and peptic ulcers (Guillemont and Jeremac 1939), etc.

By way of example, and as the principal useful fermented milks, the following curdy acid milks (Comenge, Casares) can be cited: "Lebe" from Egypt; "Yogurt" from Bulgaria and the Balkans, "Tarho" from Hungary, "Gioddu" from Sardinia, "Kos" from Albania, "Mazum" from Armania, "Grusavin" from Montenegro, "Skorup" from the Balkan countries, "Kaimac" from Yugoslavia, "Dahi" from India, etc. There are also viscous acid-alcoholic fermented milk such as: "Fuli" from Finland, "Taette" from Norway, "Lang" from Sweden and "Puma" from Finland, and others which are foamy, such as "Kefir" from the Caucasus, "Kumis" from the Tartarus and "Araka" from Turkestan. Finally, the acidophil milk, preferably of dietetic-therapeutic interest, should be cited.

All these milks are fermented and acidified with various micro-organisms, almost all of which are producers, to a greater or lesser degree, of lactic acid and other products. Amongst said micro-organisms the following should be cited: *Thermobacterium acidophillus* or *Lactobacillus acidophillus* (also known as *Thermobacterium intestinals*, *Microbacterium lactium* and *Plocamobacterium acidophillus*), *Thermobacterium yoghourtii*, *Thermobacterium bulgaricum* or *Lactobacillus bulgaricus*, *Streptoccus cremaris*, *Streptococcus paracitrooarus*, *Streptococcus thermophillus*, *Streptococcus lactis* (especially the Taette strain, N group), *Lactobacillus casei*, *Streptococcus Kefir*, *Sacharomyces fragilis*, *Torula Kefir*, etc.

From these the following should be emphasized, according to the importance of the products to be obtained from their fermentation: *Lactobacillus acidophillus*, which produces acidophil milk (sometimes in combination, 50:50 or 60:40, with the *Streptococcus lactis Taette*) and *Lactobacillus bulgaricus* and *Streptococcus thermosphillus* which produce yogurt, (sometimes in combination with *Thermobacterium yoghourtii*). Secondly, the Kefir and Kumis fermenting micro-organisms, two products which are not widely used in Spain but which acquired a relatively large consumption in other countries, should be emphasized.

From a therapeutic and dietetic-prophylactic point of view, the fermented milk which is of great interest is acidophil milk, since it contains the L. acidophil, a "physiological" bacillus normally found in the microbial flora of the human intestine (especially in infants and small children) together with the *Lactobacillus bifidus*. The suitable lactic bactotherapy to correct or prevent disorders, after administration of antibiotics and/or sulphamides having a broad spectrum (which practically do not discriminate between the pathogenic microbial flora and the useful symbiotic microbial flora), is that which is based on the administration of an acidophil milk, since it contributes and introduces into the intestine the suitable bacillus (*L. acidophillus*) together with the normal products of its metabolism, in such a way that it can be multiplied immediately in the human digestive system, restoring the normal intestinal microbial flora. (It should be borne in mind that the varied human intestinal flora, necessary for the biosynthesis of certain vitamins, is composed of a series of harmonious microfloras, situated approximately next to each other, so that the end products of the metabolism of the former act as a suitable nutritious medium for the following. Since the lactobacilli are found in the first stretches of the intestine, specifically in the colon, the importance thereof for the assembly of all the intestinal microbial flora can readily be understood).

Various researchers have recommended acidophil milk for intestinal disorders and they have isolated the L. acidophil from the excrements of persons subjected to a diet containing said milk, i.e., Chaplin and Rettger in the U.S.A., Henneberg in Germany and Rafsky, Conan and MacNease, Baumgartel, Orla Jensen, Kopeloff, Haenel, etc. in various countries. Now then, the acidophil milk had been well received by the public in the United States and its ingestion has been recommended by doctors without difficulty. However, it has not been well accepted in other countries, mainly those of Europe, since the European population prefer yogurt whose consistency, flavor and taste is superior to that of acidophil milk.

On the other hand, this type of fermented milk is not very profitable due to the limited preservation time of the liquid acidophil milk (which cannot be maintained at low nor high temperature, generally at 10°C), as well as its long manufacturing process (fermentation can last for 24 hours or more), the frequency of contaminations during culture, the irregularity or variability, with regards taste and texture or consistency, of the manufacturing lots, etc.

Due to the above, for dietetic-prophylactic or therapeutic purposes, the European doctor has heretofore had no other alternative but to resort to pharmaceutical-type preparations, consisting of capsules or powders containing *Lactobacillus acidophillus* cultivated in lyophilized specific media (not necessarily lacteous). However, these products, due to their nature as a pharmaceutical preparation, are expensive, they have the serious drawback that they do not contribute the suitable culture medium, in a sufficient quality and quantity, for the introduction and proliferation of the lactobacillus in the intestine and, naturally, they do not have any nutritive value for the patient or consumer. Although they have a certain efficiency, it is obvious that they cannot be as useful as a good whole acidophil milk.

To overcome drawbacks, probably of the organoleptic type, some researchers (Henneberg, Van de Gehuchts) have recommended the elaboration of mixed acidophil milks, based on *L. acidophillus*, *L. bulgaricus* and *S. Lactis*, which would have some of the organoleptic characteristics of yogurt. Nevertheless, the quantitative control of the proportion of lactobacillus is considered to be difficult.

Subsequently, Schmidt-Burbach, Demeter and Kundrat proposed an "acidophil milk" based on *Lactobacil-*

*lus acidophillus Streptococcus lactis Taette* (N group). This culture, which seems to be symbiotic, not only assures the proliferation of the necessary L. acidophil, but notably improves the qualities of the finished product, which has a solid consistency and fairly good preservation properties. Numerous tests have been carried out on this preparation which could partially resolve the problem of an acidophil lactic diet for the doctor, because it could apparently be accepted by the normal consumers of yogurt, inasmuch as it has a desirable flavor and taste and a suitable texture. This acidophil milk has also been denominated as "biogur".

Finally, M. Carraz and A. Moulin, together with our researchers, have again studied this type of "acidophil milk", which has been innoculated with an inoculum comprising 60% *Lactobacillus acidophillus* and 40% *Streptococcus lactis Taette*. The acidophil milk obtained had the consistency of yogurt and, although it was perfectly differentiated from yogurt by the persons who tasted same, it was not rejected. The pH of this acidophil milk was of 4.0–4.4 and its acidity, expressed in lactic acid terms, was 1.02%, its preservation did not seen to exceed 8 to 10 days (similar to that of yogurt) and, naturally, maintained in a refrigerator at about 4° to 10°C.

In former tests, A. Moulin and M. Carraz demonstrated "in vitro" the possibility of the lactobacillus acidophillus surviving in the various media of the digestive system (gastric juices, bile, salts coming from various sources), thus confirming the studies of other researchers, already mentioned previously.

With regards to the "acidophil milk" produced on the basic of *L. acidophillus* and *S. lactic Taette*, this was also studied from a therapeutic point of view on 62 patients, mainly on small children. The tolerance to this milk was considered excellent and was accepted quite well, since only 2 of the children rejected it. With regards to its therapeutic properties, a clear improvement was noted in diarrhea, vomitting and intestinal disorders in hypothrophic children and those of retarded growth. On the other hand, the L. acidophils were clearly found in the excrements of 18 patients and there was a tendency to normalization of the Proteus, Pseudomonas and Klebsiellas pathoganic intestinal flora to non-pathogenic *Escherichia coil* strains. The same researchers recognized that it was not only the presence of the *L. acidophillus* introduced in the intestine which caused the favourable change in the clinical charts, but also that the consumption of the acidophil milk mass introduced important growth factors of the acidophil bacillus already existing in the intestine of the patients.

With the bibliographical precedents studied, and in part, experimentally demonstrated, the investigations, object of this patent of invention, were directed to preserve, overcome or correct, depending on the case, by means of original processes, the following facts and problems:

a. The acidophil milk, obtained by fermenting the milk with the Lactobacillus acidophillus, is an excellent dietetic-prophylactic and therapeutic recourse to prevent or correct numerous intestinal disorders in humans, including those produced by the administration of antibiotics and sulphamides having a broad spectrum.

b. The disorders are not only overcome by the possible introduction of the acidophil lactobacillus into the intestine, but by the simultaneous ingestion of the favorable nutritious medium, for the proliferation thereof, which constitutes the usual mass of the acidophil milk.

c. The classical acidophil milk, fermented only with the *L. acidophilllus*, although widely used and accepted in the United States, is generally rejected for organoleptic reasons (favorable, taste and consistency, above all) by European patients or consumers who are used to yogurt.

d. The manufacture and commercialization of the acidophil milk made by fermentation with the acidophil bacillus, has, industrially speaking many difficulties due to the long duration of the culture (sometimes more than 24 hours), the possibility of contaminations, the irregularity of the lots, the bad preservation of the fresh product, etc. which results in uneconomical operation.

e. The deficient organoleptic qualities (at least on the European level) of the prior acidophil milk, together with the mentioned technical and commerical difficulties, have determined the non-development of the acidophil milk market in Spain, and generally speaking, in Europe. Consequently, when a doctor attempts to restore or prevent thhe destruction of the microbial flora of the human intestine, he can only resort to pharmaceutical preparations which are generally very expensive and which, on the other hand, have the defect of not simultaneously contributing the specific nutritious medium for the proliferation of the lactobacillus in the intestine, nor the caloric, nutritious or food value for the patient.

f. Another acidophil milk, or biogur, has been created which has been produced by fermenting the milk with a symbiotic culture of *Lactobacillus acidophillus* and *Streptococcus lactis Taetta*, which preserves the dietectic-therapeutic properties of the classical acidophil milk and improves, to a certain extent, the manufacturing and preservation requirements therefor, as well as its organoleptic qualities. However, it can clearly be distinguished from yogurt, and its compulsory preservation in a refrigerator is no better than that of yogurt.

The process for producing and preserving acidophil milk, the object of the present invention, is mainly based on the combination and harmonization of cultivating and drying processes (which can generally be applied to other fermented milks, with slight modifications, as well as be explained in the case of yogurt) which permits: obtention of abundant lactobacillus cultures; grading the contents of the live lactobacillus in the product by the weighted addition of excipients corresponding therewith; a practically unlimited preservation without the need of refrigeration, since the product is in a dry powdered form; an easy and rapid reconstitution, ready to be consumed, by means of simply restoring the original water; improving the organoleptic qualities by the incorporation of harmless hydrophil substances which give same a creamy consistency, of fruit essences and sweetening substances to satisfy the taste of certain consumers or to lessen undesirable flavors or colours; possibility of being consumed by certain persons (diabetics, pre-diabetics, etc.) due to the incorporation of suitable natural or synthetic sweetening agents, instead of the conventional sugars; possibility of approaching the organoleptic qualities of yogurt, due to the rational mixture of the dry mass thereof with the dry mass of yogurt in suitable proportions so that the predominating character of the acidophil milk is not lessened; relatively economical production and commercialization costs since inexpensive processes of careful spray-drying (whereby the main mass of the nutritious medium of the fermented milk is obtained in a dry form) are combined with other more expensive lyophilization processes having a small but rich mess of micro-organisms (whereby the appropriate and standardized quantity of live and dry lactobacillus is contributed to the main sprayed mass; use of cheap containers (unidosage containers of metalized or plasticized paper or the like, or multidosage containers of metal, or metalized cartons and the like) as well as the saving in space and, therefore, in transportation, storage and handling costs, since the product does not contain water; highly interesting dietetic and therapeutic products since bromatologists, nutrition specialists, doctors and the consumers in general, have at their disposal and at reasonable prices not only the acidophil lactobacillus which can be introduced into the intestine, but also the nutritious medium appropriate for its better proliferation as well as a food product having a considerable caloric and nutritious value for the consumer or the patient.

This complex process can be carried out by the following steps, means and conditions:

1. *The Lactobacillus acidophillus*, which is preferably resistant to antibiotics and sulphamides having a broad spectrum, is removed from the excrement of the patients, about 5 days after having been administered with a strong dosis of antibiotics. The resistant lactobacillus can also be removed by selecting the surviving ones from cultures, in the liquid medium to which antibiotics and/or sulphamides have been added, at concentrations customary for the human intestine and for the main organic fluids (plasma).

2. A *lactobacillus acidophillus* inoculum (optionally, combined with *Streptococcus lactis Taette* in a proportion of approximately 60:40 to 40:60) is prepared in a suitable liquid medium, for example skim milk rich in vitamins of the B group (especially thiamine, riboflavin, nicotinic acid and panthotenic acid), folic acid, vitamin C, etc. Other media are made up on the basis of milk or lactose, liver and carrots, or by modifying the Briggs medium with tomato juice.

3. Whole, semi-skim or skim milk, which has previously been sterilized and concentrated in vacuum to about ⅔ of its original volume, is inoculated with a portion of the inoculum. The most practical, convenient and economical method of concentration resides in the addition of the corresponding powdered milk (about 6.2 g/100 cc) (in the case of especially rich whole milk, the whey of powdered milk will suffice) and is then sterilizing by heating. In this way, the liquid milk has a solid concentration of approximately 18.7%.

4. The solid enriched milk which has been inoculated with the lactic bacillus, is fermented at about 38°–40° for 2–6 hours (in the case of the symbiotic culture comprising *L. acidophillus* and *S. lactis Taette*) or for 6–20 hours (in the case of a culture comprising *L. acidophillus* only). The final point of fermentation is clearly seen by the relative hard consistency (or at least creamy) acquired by the acidophil milk mass which, in general, appears as a light gel.

5. A culture medium is inoculated with another portion of the inoculum, which medium can have characteristics similar to those of the inoculum, and is specifically studied for an abundant and specific proliferation of the bacillus in question (in this case the *L. acidophillus*), the organoleptic qualities thereof becoming of secondary importance. This medium is cultivated taking advantage of the logarithmic growth of the bacillus; generally the growing time is from 4 to 8 hours, at a temperature of 38° to 40°C.

6. The acidophil milk obtained in step 4 is passed to a trough provided with a mixer wherein the required sugars (6a) are added thereto so that, when reconstituting with water at the time of consuming same, it has certain suitable organoleptic qualities (in this case sweetening qualities). If saccharose is used, the addition can vary from 15 to 25%, normally 20%. At this moment this suitable thickening or gelating agents (6b), intimately mixed with the sugar, are added thereto, which agents will produce, when restoring the water to take the product, the texture, consistency or creaminess which pleases the consumer and which is expected by him. Various types, as well as combinations, of pectates, alginates, carrageens and cellulose derivatives can be used as thickening agents or gelifiers, at a concentration of about 0.1 to 5%, depending on the types or mixtures of the chosen thickening agents. Generally, if alginates or pectates or mixtures of the former with carboxymethylcellulose are used, then the concentration can be form 1 to 2%. Optionally, essences, concentrated juices or fruit pulps can also be added here in rather variable quantities, depending on the type of product, so that the fermented milk (6c) can adopt various flavors and colors. Also optionally, but instead of the saccharose, other sugars, such as fructose, or sweetening mixtures, such as sorbitol and saccharine, which can be metabolized by the diabetics and pre-diabetics, can also be added in this step, in such a way that they constitute a sweetening mass having a strength equal to that of the saccharose which is substituted by (6d). This latter acidophil milk will, therefore, have a dual diabetic effect.

7. The fermented acidophil milk, with the products added in step 6, which reaches an approximately 40–50% solids, is rapidly homogenized at a medium or low pressure, to make the product uniform, to break the gel particles and to make it more fluid.

8. The fermented milk which is rich in solids, is immediately introduced into an atomizer and is subjected to a careful spray-drying process to preserve the maximum biological qualities of the product (enzymes, vitamins and other labile nutritious factors) and even a certain survival of germs, although in the majority of the cases this is small. It has been observed that when hot air at 250°C is introduced into the atomizer, to dry the pulverized droplet of the product in solution or suspension, the heat in the interior of same does not normally exceed 80°C, which is explained by the elevated evaporating latent heat of water which, on evaporating, partially takes it up itself, thus producing a certain "cooling" in the interior of the droplet. On the other hand, the drying process is practically instantaneous, whereby the product is subjected to moderately high temperatures for a very short period of time, and the majority of its biological and nutritious components are preserved integrally. If, instead of using drying air at 250°C, air at about 130°–150°C is used, a certain survival of germs can even be achieved, although evidently, the yield of the drying process is reduced and the spraying costs are increased. Both features should be harmonized. Generally speaking, temperatures between 130° and 180° can be used to obtain a certain survival of germs and 180° to 300°C can be used to obtain a good spraying which preserves its nutrients but only a few or no germs, although this is not excessively important since the enrichment of the product with live lactobacillus is provided for in a subsequent step. The spraying process, in our opinion, can be carried out acceptably between 150° and 250°C.

9. Once sprayed, the product can pass, optionally, to an "instantaneization" (remoisturing and drying on a fluid bed) to improve its redissolution in water.

10. It is then introduced in a storage tank for subsequent processes, which will lead to the final product.

11. The culture abundant in lactobacillus obtained in step 5, is subjected to a careful lyophilition drying process, to achieve the maximum survival of the microorganisms. Unlike the general lyophilization of food products, the practical objective of which is the preservation of their texture and of their main nutrients and which, therefore, can be carried out within a reasonable period of time (about 8 hours) and under inexpensive operating conditions (product at −10°C, condenser at −40° or −50°C, and vacuum in the range of $10^{-2}$ mm. Hg, which can be obtained with a mere rotary blade pump), the present invention seeks to preserve the life of microorganisms, such as the lactobacillus, and therefore following conditions are required:

a. the product to be lyophilized must be frozen as quickly as possible, at about −30° to −50°C (to overcome possible eutectic points)

b. the temperature in the condenser is from −60° to −80°C (to provide sufficient temperature gradient within a reasonable time)

c. the vacuum in the enclosure is from about $10^{-3}$ to $10^{-5}$ mm. Hg (to facilitate the flow of the steam sublimated from the product to the condenser), which requires coupling, in cascade, of a rotary vacuum pump and a diffusion pump;

d. vigilance and maintenance of special lyophilization conditions, especially, temperatures, for about 24 to 48 hours, which is normally the operating time necessary for these special lyophilizations.

Under such conditions, the survival of the L. acidophil by lyophilizing our culture medium normally exceeds 90%.

12. Subsequent to lyophilization, which can be effected on trays, the dry product is slightly and carefully ground (the operation is rather easy) to a granulometry similar to that of the sprayed product (and in its case "instantaneized").

13. The count of the live lactobacillus per gram of dry product is then effected and it is diluted with the adequate amount of excipient (13a) (which can be lactose, powdered skim milk, whey of powdered milk or even this sprayed acidophil milk itself coming from step 10, etc.) to reach the appropriate grading (about 5,000 million lactobacillus per gram; a bacillus content of 10,000 million per gram, or even higher, can be effective).

14. The pulverized product containing the live lyophilized and graded lactobacillus (for example, a lactobacillus richness of 10,000 million per gram) is opportunely stored in a dry and cold enclosure (preferably in a cold chamber).

15. Subsequently, the sprayed acidophil milk and the dry powdered culture of the live and graded lactobacillus is introduced in a suitable mixer, in a proportion of approximately 40 parts by weight of acidophil milk to 2 parts of live dry lactobacillus culture (that is, the graded lactobacillus culture constitutes approximately 5% of the mass of the sprayed acidophil milk). This percentage can vary depending on the richness of the lyophilized culture and it is generally convenient to reduce it by correspondingly increasing said live lactobacillus richness in the graded milk). Optionally, sprayed yogurt powder can be incorporated and mixed to improve, if desirable, the organoleptic conditions of this acidophil milk, by way of example, 20 parts of sprayed yogurt, 20 parts of acidophil milk and 2 parts of live graded lactobacillus (15a) can be mixed. Thus, the definite powdered acidophil milk or dry "biogur" is obtained. With 42 grams of this acidophil milk and by adding the necessary water, 100 to 125 cc of liquid acidophil milk, ready for use by the consumer, can be obtained; which milk has a generally suitable texture or creaminess and organoleptic qualities. This acidophil milk will have a *Lactobacillus acidophillus* richness of about 200 million germs per cc., corresponding to the maximum values described by Carraz, Moulin and other researchers for aciophil milks, although a small lactobacillus content (half or less) is admissible.

16. The dry powdered "live" acidophil milk which comes from the mixer, is sent to the packing plant to be packed into sealed containers, preferably in unidosage containers of metalized or plasticized paper and the like.

The complete manufacturing process expained is schematically demonstrated by means of the following diagram, wherein the sequence of the numerical order of the previously described operations coincides with the enumeration specified in said scheme.

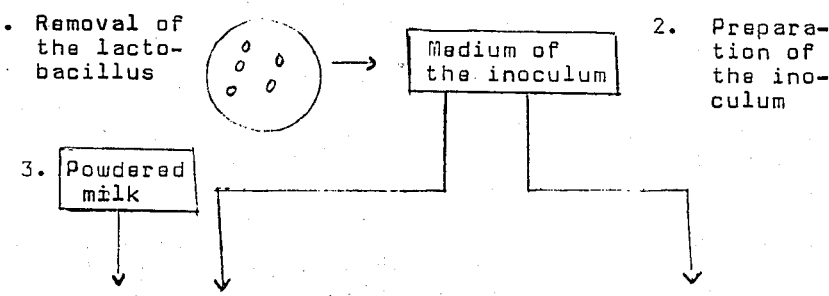

1. Removal of the lactobacillus

2. Preparation of the inoculum

Medium of the inoculum

3. Powdered milk

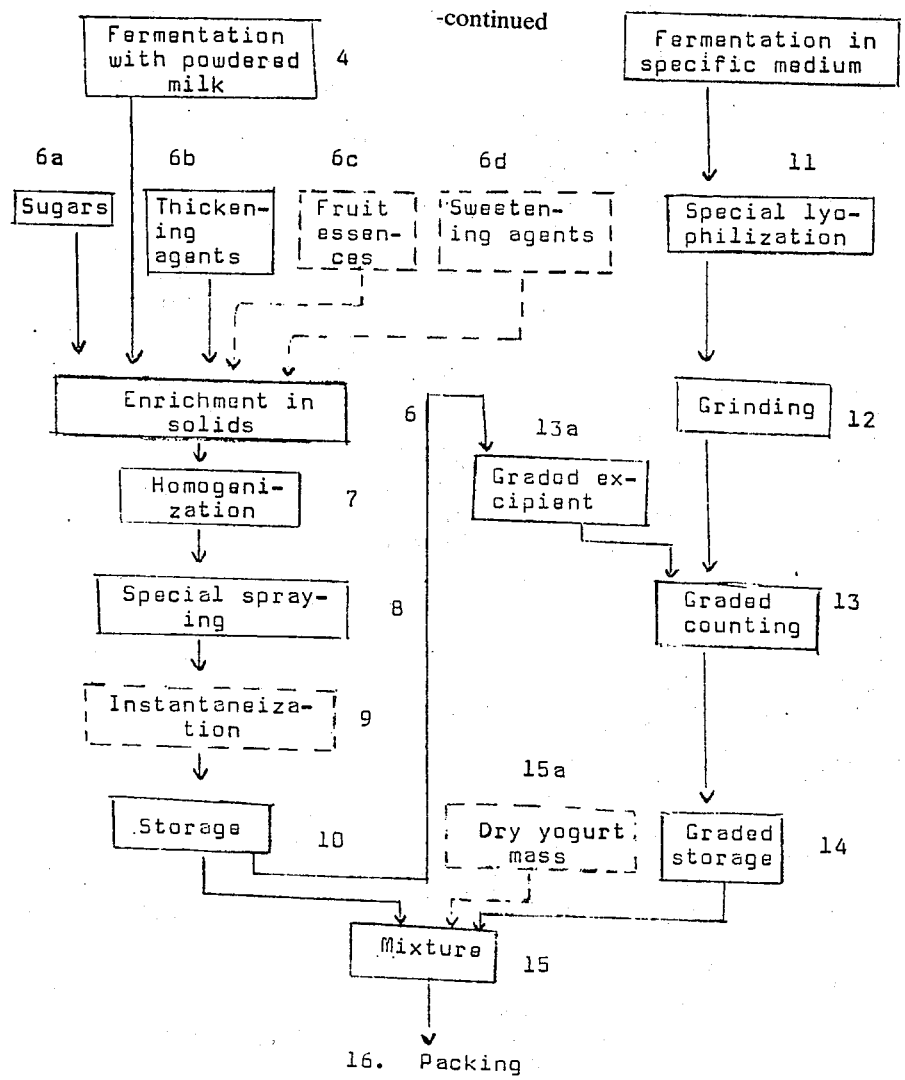

-continued

The process of manufacturing dry powdered "live" acidophil milk is applicable, with slight changes mainly depending on the diverse nature of the corresponding germs, to practically all fermented milks, such as yogurt, Kefir, Kumis, "Babeurre", etc.

By way of example, we refer to milk which has been fermented with *Lactobacillus bulgaricus* and *Streptococcus thermophillus*, some times associated with *Thermobacterium yoghourtii*, commonly known as yogurt.

We shall, in the first place, explain briefly the problems posed by yogurt, and its uses, limitations and applications, since diverse requirements or details, which are taken into account in the drying and preservation process, object of this invention, can be clarified.

Yogurt, as already mentioned, is a fermented milk having a Balkanic origin and a secular tradition, whose consumption has been widely extended throughout the world, first because of the investigations carried out by Metschnikoff at the beginning of this century who considered it as having a longevity source and, subsequently, because of its undoubted dietetic properties, thus constituting in itself a pleasing food product of easy digestibility and having an outstanding nutritive value.

The efficiency of yogurt, to prevent or correct certain intestinal disorders seems to be undoubted, since daily experience has confirmed this fact. Doctors themselves recommend this simple familiar therapy to their patients for most of the digestive disorders. Yogurt has become a compulsory complement in all antibiotic medications (Carraz et al.).

However, there are numerous controversies concerning the role played by the lactobacillus and streptococcus of the in the human being. For some, the lactic germs of the yogurt play an important role in the digestive system, in view of the pathogenic germs, due to microbical concurrence. For others, the yogurt represents a more digestible form of milk, due to the presence of the more assimilable proteins and aminoacids or other substances which stimulate the digestive function, intestinal peristalsis, etc. (alcohols, aldehydes, acids, etc.). What is apparently clear is that the *Lactobacillus Bulgaricus* of the yogurt is not introduced in the intestine; according to Cheplin (1921), only the acidophil lactobacillus can partially replace the intestinal microbial flora and this is what is inexorably restored (it is normalized) once administration of the large dosis of acidophil cultures has terminated. In short, the *Lactobacillus bulgaricus* does not apparently have any specific action, as such microorganisms.

Yogurt has, in our opinion, various effects and important applications. Firstly, it constitutes an excellent culture medium for the regeneration and proliferation of the "physiological" lactobacillus of the human intestine, *L. acidophillus* and *L. bifidus* (metabolites produced by the fermentation of milk with *L. bulgaricus*, should be rather similar to those produced or required by the lactobacillus of the intestine). Consequently, only this fact can explain the preservation or regeneration of the microbial flora of the human intestine, independently of the fact that the *lactobacillus bulgaricus* passes the gastric barrier unharmed (which fact is doubtful) and can be introduced or not into the intestine; (the concatenation and sequence of the intestinal microfloras, which depend on the former and determine the following, should furthermore be remembered). Secondly, it has been demonstrated that milks fermented with certain lactobacillus, amongst them, those of the yogurt, has pathogenic microorganism inhibiters, amongst which can be found lysine, produced by the *S. lactis* and discovered by Mattick and Hirsch in 1944, a very powerful antibiotic which inhibits the growth of the majority of the pathogenic streptococcus and certain bacillus and clostridium, but which does not act on the normal intestinal flora. These facts, together with the former, contribute to explain the beneficial action of yogurt in toxi-infectious intestinal discorders. Thirdly, yogurt contains suitable metabolites for the physiological functioning of the intestine since, for example, the lactic acid suitably stimulates the intestinal peristalsis, thus this fermented milk is not only useful in overcoming diarrheaic processes, but also to correct constipation (it is a normalizer of the digestive tube). Finally, yogurt constitutes in itself an excellent, easily digestible food product (fermentation, especially that of yogurt, improves the digestibility of all types of milk), having an excellent nutritive strength and whose organoleptic qualities (creamy, texture flavor, taste, etc.) are vary pleasing to the majority of the people.

As can be appreciated, the survival or not of the lactobacillus bulgaricus in the yogurt drying process should not be considered, since its multiple beneficial effects seem to be independent of such survival.

However, perhaps for commercial reasons or to industrial interests in the large milk sectors, a group of experts of the International Milk Federation (Group D7 of the I.M.F.), during a meeting held in Brussels in July 1972, concluded that "considering the growing importance attributed, in the nutrition and immunological media, to the ingestion of the micro-organisms characteristic of yogurt (?) and also considering the confusion which can take place, on the part of the consumer, if the word 'yogurt' were used indifferently for products containing live micro-organisms and products where these same micro-organisms have been destroyed by a thermal treatment, the Group considered that the word 'yogurt' or similar words used separately or combined with other words, should not be employed to designate products which do not have live micro-organisms". However, the opinion of this group is not shared by all the scientists and technicians of the milk sector of the world, since in the latest Congress of the I.M.F. held in October 1972 in Tokyo, this subject was not agreed upon and it was postponed for the next annual meeting.

This aspect is important, since when the survival of the lactobacillus bulgaricus in the yogurt is not required, this can be more readily dried at a lower cost, since with our process, steps 5 (fermentation in a specific medium), 11 (special lyophilization), 12 (grinding), 13 and 13a (counting and grading) and 15 (mixing) can be eliminated. In any case, a certain survival can be obtained, as already mentioned, by careful spraying.

Nevertheless, to overcome any future needs with regards to the requirements of the survival of the lactic bacillus, our method of drying the fermented milk having a therapeutic, dietetic or food interest, in the case of yogurt, still includes said steps, the object of which is to insure a certain live lactobacillus content in the dry product.

The method, which is generally applicable to all types of fermented milks, particularly with respect to yogurt, take into account the following details which, on the other hand, can readily be understood:

a. In step 1, isolation of the microorganisms should be directed to the *Lactobacillus bulgaricus*, to the *Streptococcus thermophillus* and, optionally, to the *Thermobacterium yoghourtii*.

b. In step 2, the medium of the inoculum will differ somewhat from that used in the case of acidophil milk, in the sense of making it more specific for the three micro-organisms previously mentioned.

c. In step 4, fermentation of the milk can and should be carried out within a more elevated temperature range (from 40° to 45°C) and the time required is shorter (from 3 to 6 hours).

d. In step 5, a specific fermentation medium is included, specially studied for the abundant proliferation and growth of the *L. bulgaricus*.

e. Optional step 15a is not necessary.

A similar method can be applied to obtain, in a dry powdered form, all fermented milks to be used therapeutically, prophylactically, dietetically or as a food product (Kefir, Kumis, Gioddu, etc.). In the case of acid-alcoholic milks, reconstitution, at the appropriate moment, is effected with a hydroalcoholic solution of the desired degree.

I claim:
1. A process for drying and preserving acidophil fermented milk in powdered form so that it can be readily reconstituted with water, which comprises:
   1. culturing a lactic acid producing microorganism in a culture medium to produce an inoculum;
   2. sterilizing milk to be fermented, and adjusting the solids content of said milk to approximately 16 to 20% solids content;
   3. fermenting the milk of step (2) with the inoculum of step (1) in a continuous or discontinuous manner;
   4. inoculating a culture medium with the inoculum of step (1) and fermenting under conditions sufficient to obtain a large proliferation of the lactic acid producing microorganism;
   5. enriching the solids content of the fermented milk of step (3) with
      a. 15 to 20% sugars or other sweeting agents and
      b. 1 to 2% thickening agents
   6. homogenizing the sweetened, fermented milk of step (5) by mechanical means to destroy any gelled particles and to improve fluidity;
   7. spray drying the product of step (6) at from 130° to 180°C, where the survival of lactic acid producing microorganisms is desired, or at 180° to 300°C where such survival is not necessary but increased yields are desired;
   8. agglomerating the product of step (7) in a moist atmosphere and then drying it in a fluidized bed;

9. lyophilizing the lactic acid producing microorganisms from the fermentation of step (4) by rapid freezing under conditions to promote the survival of the said microorganisms and thereby produce a foamy freeze-dried mass comprising live lactic acid producing microorganisms;

10. grinding the foamy mass resulting from the lyophilization of step (9) to a granulometry similar to that of the product of step (8);

11. mixing the lyophilized product of step (10) with an excipient so as to achieve a lactic acid microorganism content in the lyohilized product of $10^{10}$ microorganisms per gram;

12. mixing the lyophilized product of step 11) with thhe product of step 8) in a proportion of approximately 40 parts by weight of the product of step (8) and 2 parts by weight of the product of step (11 ) so that when reconstituted with water in an amount of 42 grams of fermented dry milk per 100 to 125 cc of water, there is obtained a creamy, liquid, fermented acidophil milk having about 200 million lactic acid producing microorganisms per cc.

2. The process according to claim 1 wherein the lactic acid producing microorganism strain employed is one which is resistant to antibiotics and sulfamides.

3. The process according to claim 1 wherein the microorganism employed is *Lactobacillus acidophillus* or a mixture of *Lactobacillus acidophillus* and *Streptococcus lactis Taette*.

4. The process according to claim 1 wherein the microorganism employed is a mixture of *Lactobacillus bulgaricus* and *Streptococcus thermophillus yoghourtii* with or without *Thermobacterium yoghourtii*.

5. The process according to claim 1 wherein the sugar or sweetening agent is saccharoose, fructose or a mixture of sorbitol and saccharine.

6. The process according to claim 5 wherein the thickening agent is a pectate, alginate, carrageenin, cellulose derivative or mixtures thereof.

7. The process according to claim 1 wherein the lyophilization conditions comprise rapid freezing to −30° to −50°C to produce a foamy mass.

8. The process according to claim 1 wherein the excipient of step (11) is selected from the group consisting of lactose, powdered milk and powdered whey.

* * * * *